United States Patent Office 3,082,235
Patented Mar. 19, 1963

3,082,235
1-OXA-2-ALUMINA-3-THIO CYCLO KETONES
AND THEIR PREPARATION
Walter Stamm, Dobbs Ferry, N.Y., assignor to Stauffer
Chemical Company, New York, N.Y., a corporation of
Delaware
No Drawing. Filed July 28, 1961, Ser. No. 127,481
6 Claims. (Cl. 260—448)

This invention relates to organoaluminum compounds and, in particular, to heterocyclic aluminum derivatives in which the aluminum atom is a member of a heterocyclic ring system. The invention also pertains to the preparation and uses of such compounds.

The organometallic aluminum derivatives as contemplated herein, can be formalistically represented as follows:

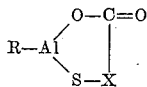

wherein R signifies hydrogen or an alkyl group of from 1 to 10 carbon atoms such as methyl, ethyl, n-propyl, n-butyl, isobutyl, isopentyl, n-pentyl, n-hexyl, isohexyl, n-heptyl, n-octyl, isooctyl, isononyl, n-decyl and the like and X represents a hydrocarbon grouping as exemplified by a lower alkylene chain, e.g., methylene, ethylene, propylene, butylene, etc., an arylene bridge such as o-phenylene, o-naphthylene, and the like.

Examples of compounds falling within the scope of the above depicted formula are the following:

COMPOUND 1

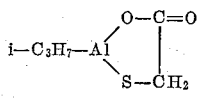

COMPOUND 2

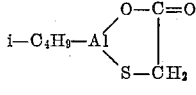

COMPOUND 3

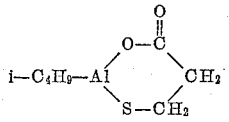

COMPOUND 4

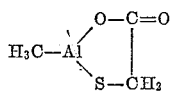

COMPOUND 5

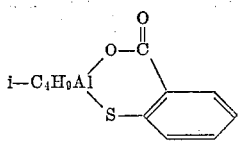

COMPOUND 6

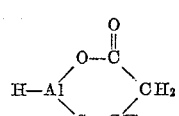

COMPOUND 7

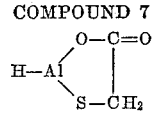

COMPOUND 8

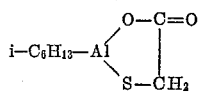

COMPOUND 9

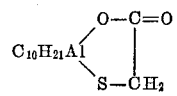

COMPOUND 10

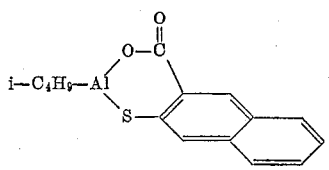

The aforedescribed organoaluminum compounds are produced by reacting an alkylated aluminum with a lower mercaptoalkyl carboxylic acid or salt thereof. It has been ascertained that excellent results are obtained by condensing a trialkyl aluminum of from 1 to 10 carbon atoms with a lower mercapto alkyl carboxylic acid. The following equations are a schematic representation of the reaction:

$$(R)_3Al + HOOC-X-SH \longrightarrow (R)_2-AlOOC-X-SH + RH$$

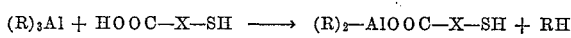
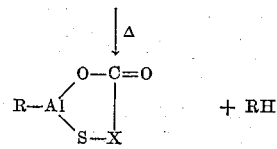

As can be seen, the formation of the cyclic organoaluminum compound takes place in two stages. There is an initial condensation between the trialkyl aluminum and mercaptoalkyl carboxylic acid to form an intermediate structure which subsequently undergoes ring closure when subjected to mild heating. In carrying out the cyclization, it is recommended that the reactants be used in the form of highly diluted solutions. The greater distances between molecular species in such solutions tends to promote an intra-molecular reaction with concomitant greater yields of cyclic products. On the other hand, more concentrated solutions containing larger numbers of reacting species facilitates an intermolecular reaction which gives rise predominantly to linear products at the expense of diminished yields of ring compounds. For the aforesaid reasons, the cyclic organoaluminum derivatives of the invention are desirably formed under conditions of high dilution.

A typical procedure for synthesizing the cyclic organoaluminum derivatives of the invention involves bringing the alkylated aluminum and lower mercapto alkyl carboxylic acid in contact with each other at room temperature whereby an alkane hydrocarbon is eliminated with production of a linear intermediate adjunct of the type shown in the above depicted chemical equations. The formation of the intermediate product occurs rapidly and is indicated by the appearance of a white precipitate. In order to bring about ring closure, the reaction mixture is mildly heated, preferably in a temperature range of from between 40 to 70° C. During the ring closure stage, a second equivalent of an alkane hydrocarbon is produced while simultaneously a color change takes place and the original white of the reaction mixture is replaced by an orange or red coloration. By distilling off the solvent, the reaction product is isolated as a solid crystalline residue. Because aluminum trialkyls are spontaneously flammable in air, the employment of these reactive entities necessitates carrying out such reactions in an inert atmosphere, preferably dry nitrogen.

The organoaluminum derivatives can also be prepared by another procedure in which the aluminum trialkyl employed in the previously described reaction is replaced by an alkyl aluminum dihalide and the lower mercapto alkyl carboxylic acid is utilized in the form of one of its salts, preferably as an alkali metal salt. In this alternate mode of synthesis, no alkane hydrocarbon is formed, the by-product being a metal halide salt. The reaction is schematically portrayed by the following equation:

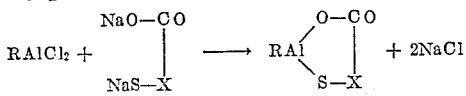

wherein R and X have the significance as previously designated.

The lower mercapto alkyl carboxylic acids are known substances and their preparation and description can be found in the chemical literature. The alkylated aluminum components are likewise known materials and are disclosed in various prior art publications including both chemical text books and periodic literature.

The cyclic organoaluminum compounds of this invention are high melting microcrystalline solids varying in color from light yellow to orange-red. They are remarkably heat stable and are also relatively inert towards cold water or oxygen. They do, however, burn vigorously after ignition. All of the compounds tend to be more or less soluble in anhydrous benzene or in anhydrous ethers such as, for example, tetrahydrofuran. They react with warm water and even more readily with organic solvent containing water, with alcohols, phenols and acidic or caustic materials. When reacting with the aforesaid acidic materials, one equivalent of the corresponding alkane hydrocarbon is evolved quantitatively; the residual hydrolytic product is presumed to be:

COMPOUND 11

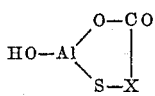

wherein X has the meaning previously assigned.

Reference is now made to the following examples which are inserted for the sole purpose of illustrating the invention in greater detail. However, those having skill in the art to which it pertains will recognize that various modifications and ramifications can be carried out while keeping within the scope and spirit of the invention.

EXAMPLE 1

2-Isobutyl-1-Oxa-2-Alumina-3-Thiacyclopentan-5-One

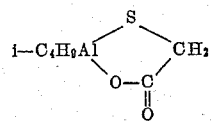

To 18 g. of distilled thioglycolic acid in 200 cc. anhydrous benzene was added 40 g. of distilled triisobutylaluminum while maintaining the reaction at room temperature over a period of two hours. During this interval, a white precipitate formed and in a −78° C. trap—connected through an effective water condenser with the reaction flask—16 cc. of isobutane was collected. The reaction mixture was then brought to 60° C. with continued agitation, whereupon the white product dissolved. The clear solution became bright yellow, the intensity of which increased as the reaction progressed. After three hours at 60° C. the reaction was complete as indicated by the condensation of another 16 cc. of isobutane in the cold trap. The benzene was distilled off, leaving a yellow, crystalline residue in the reaction flask. No unreacted thioglycolic acid or triisobutylaluminum were found. The yield was essentially quantitative (35 g.) and the structure was confirmed by aluminum and sulfur analyses. The product showed no melting point. Slow decomposition commenced at around 300° C.

EXAMPLE 2

2-Isobutyl-1-Oxa-2-Alumina-3-Thiacyclohexane-6-One

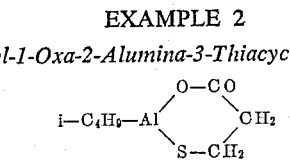

Twenty grams of β-mercaptopropionic acid was dissolved in 200 cc. absolute benzene to which was added with vigorous stirring 40 g. of triisobutylaluminum within two hours at about room temperature. This was followed by two hours of gradual heating to 65° C. At 55° C. the clear solution changed from colorless to yellow. Thirty-two milliliters of isobutane was condensed in a −78° C. cold trap. The solvent was distilled from the reaction product at reduced pressure. There remained an intensively yellow-colored, microcrystalline powder, which decomposed above 330° C.

Eighteen grams of this product was hydrolyzed by dissolving it in 100 cc. of warm benzene followed by 50 cc. of water, acidified with 10 cc. of acetic acid; the addition was carried out very slowly with vigorous agitation at 40–50° C. In a −78° C. cold trap, connected with the reaction flask through a water-cooled condenser, 8 ml. of isobutane was collected over an interval of 5 hours. The structure agreed with the formula of Compound 11.

The compound of this example was also prepared in the following manner:

To a solution of 11 g. of β-mercaptopropionic acid in 100 ml. of toluene, was added 11 g. of anhydrous sodium carbonate with stirring. The mixture was then refluxed for two hours, while 17 ml. of water was collected in a Dean-Starck trap.

To the vigorously agitated dispersion of disodiomercaptopropionate, 16 g. of distilled isobutylaluminum dichloride was added within one hour, while the colorless solution turned bright yellow. Agitation was continued for 2 hours at 90° C., after which the sodium chloride was filtered off and washed with hot benzene. The yield of dry salt was 11.5 g. which is in accordance with the above proposed equation. The crystalline, yellow reaction product was identical with that prepared by the previous method.

EXAMPLE 3

(2-Isobutyl-4,5-Phenylene)-1-Oxa-2-Alumina-3-Thiocyclohexane-6-One

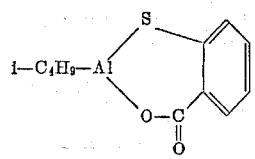

This compound was prepared by a method analogous to Examples 1 and 2. It is crystalline and orange-red in color and quite soluble in anhydrous tetrahydrofuran and in dry acetone; it is difficultly soluble in benzene or toluene. The product reacts only very slowly with cold water but vigorously with alcohols.

EXAMPLE 4

1-Oxa-2-Alumina-3-Thiacyclohexane-6-One

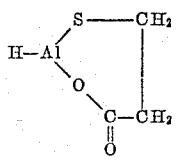

Eleven grams of β-mercaptopropionic acid, dissolved in 150 ml. toluene, was reacted with 15 g. of distilled diisobutylaluminum hydride. After the initial exothermic addition period, the mixture was heated to reflux (120° C.) for 10 hours. During that time, 17 ml. of isobutane (two moles) was collected in the cold trap (−80° C.). The toluene solvent was flash-evaporated under high vacuum, leaving a microcrystalline light yellow, hygroscopic residue.

It will be recognized by those skilled in the art that the cyclic organoaluminum compounds as herein contemplated, represent a new type of chemical intermediate, and are thus valuable in the field of chemical synthesis. Furthermore, it has been ascertained that the compounds are useful as rubber accelerators. For instance, styrene-butadiene rubber was formulated containing two parts of the cyclic aluminum derivative per 100 parts of rubber. When rubber, treated in the above manner, was assayed, it was found that the organoaluminum compound functioned both as a rubber accelerator and as an anti-oxidant. Our compounds can be used in other applications calling for the use of an anti-oxidant such as in the compounding of plastics and similar polymeric materials.

I claim:

1. A cyclic organoaluminum compound having the following formula:

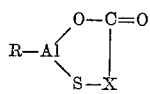

wherein R is selected from the class consisting of hydrogen and alkyl groups of from 1 to 10 carbon atoms and X represents a hydrocarbon grouping selected from the class consisting of lower alkylene, o-phenylene and o-naphthylene.

2. A cyclic organoaluminum compound having the following formula:

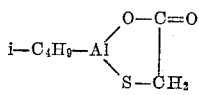

3. A cyclic organoaluminum compound having the following formula:

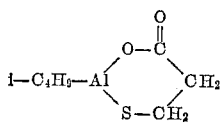

4. A cyclic organoaluminum compound having the following formula:

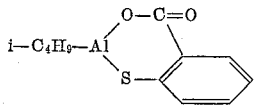

5. A cyclic organoaluminum compound having the following formula:

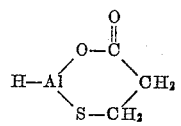

6. A method of preparing a cyclic organoaluminum compound having the following formula:

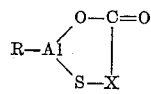

wherein R is selected from the class consisting of an alkyl group of from 1 to 10 carbon atoms and X is a hydrocarbon grouping selected from the class consisting of a lower alkylene bridge, an o-phenylene group and an o-naphthylene group which comprises reacting an alkylated aluminum selected from the group represented by the following formulae:

$$(R)_3Al \text{ and } R_2AlCl$$

wherein R has the significance as above depicted with a lower mercapto alkyl carboxylic acid and the metal salts thereof in order to form a linear intermediate product, having the following general formula:

$$(R)_2AlOOC-X-SH$$

wherein R and X have the significance as above defined and heating the said intermediate product as mildly elevated temperatures to effect cyclization thereof in order to yield the aforesaid cyclic organoaluminum compound.

References Cited in the file of this patent
UNITED STATES PATENTS 2,648,650    Weinberg _____ Aug. 11, 1953
2,973,379    Kabayashi et al. _____ Feb. 28, 1961